United States Patent
Sharifi Mehr

(10) Patent No.: US 10,454,975 B1
(45) Date of Patent: Oct. 22, 2019

(54) CONDITIONAL COMPTUING RESOURCE POLICIES

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 245 days.

(21) Appl. No.: 15/186,310

(22) Filed: Jun. 17, 2016

(51) Int. Cl.
*H04L 29/00* (2006.01)
*H04L 29/06* (2006.01)

(52) U.S. Cl.
CPC ............ *H04L 63/205* (2013.01); *H04L 63/08* (2013.01); *H04L 63/105* (2013.01)

(58) Field of Classification Search
CPC ...... H04L 63/205; H04L 63/08; H04L 63/105
See application file for complete search history.

(56) References Cited

U.S. PATENT DOCUMENTS

| | | | | |
|---|---|---|---|---|
| 8,015,600 | B2* | 9/2011 | Sinn | G06Q 10/06 713/156 |
| 9,235,649 | B2* | 1/2016 | Teng | G06F 21/41 |
| 9,471,798 | B2* | 10/2016 | Vepa | H04L 41/0893 |
| 2002/0174238 | A1* | 11/2002 | Sinn | G06Q 10/06 709/229 |
| 2009/0063490 | A1* | 3/2009 | Fuerst | G06F 21/6227 |
| 2011/0055673 | A1* | 3/2011 | Teng | G06F 21/41 715/200 |
| 2015/0172318 | A1* | 6/2015 | Elley | H04L 63/20 726/1 |
| 2016/0092694 | A1* | 3/2016 | Lim | G06F 17/3089 726/1 |

OTHER PUBLICATIONS

David Ferraiolo et al. "A Comparison of Attribute Based Access Control (ABAC) Standards for Data Service Applications." NIST, Oct. 2016. 68 pages. (Year: 2016).*

* cited by examiner

*Primary Examiner* — Don G Zhao
(74) *Attorney, Agent, or Firm* — Davis Wright Tremaine LLP

(57) ABSTRACT

A computing resource service receives a request from a user to access a first computing resource. In response to the request, the computing resource service obtains policies applicable to the request. If the policies include at least one conditional policy that defines a dependency condition that is based at least part on privileges for accessing a second computing resource, the service determines whether the dependency condition is satisfied. If the dependency condition is satisfied, the service evaluates the obtained policies to determine whether to fulfill the request.

20 Claims, 8 Drawing Sheets

CONDITIONAL COMPTUING RESOURCE POLICIES

BACKGROUND

Computing resource policies are used in various access control mechanisms to specify the conditions for which actions may be performed on computing resources by users of these computing resources. These computing resource policies provide flexibility to administrators of computing resources to define user roles for accessing these computing resources, as well as the permissions for each user and user role in performing the various actions on the computing resources. However, this flexibility may introduce complexity that might not be desirable under certain circumstances. For example, if an administrator of a computing resource grants users access to a first computing resource, granting additional permissions to these users to access a second computing resource may be difficult, as an administrator may be required to revise existing policies related to the first computing resource to enable user access to the second computing resource.

BRIEF DESCRIPTION OF THE DRAWINGS

Various techniques will be described with reference to the drawings, in which.

DETAILED DESCRIPTION

Figure 1:
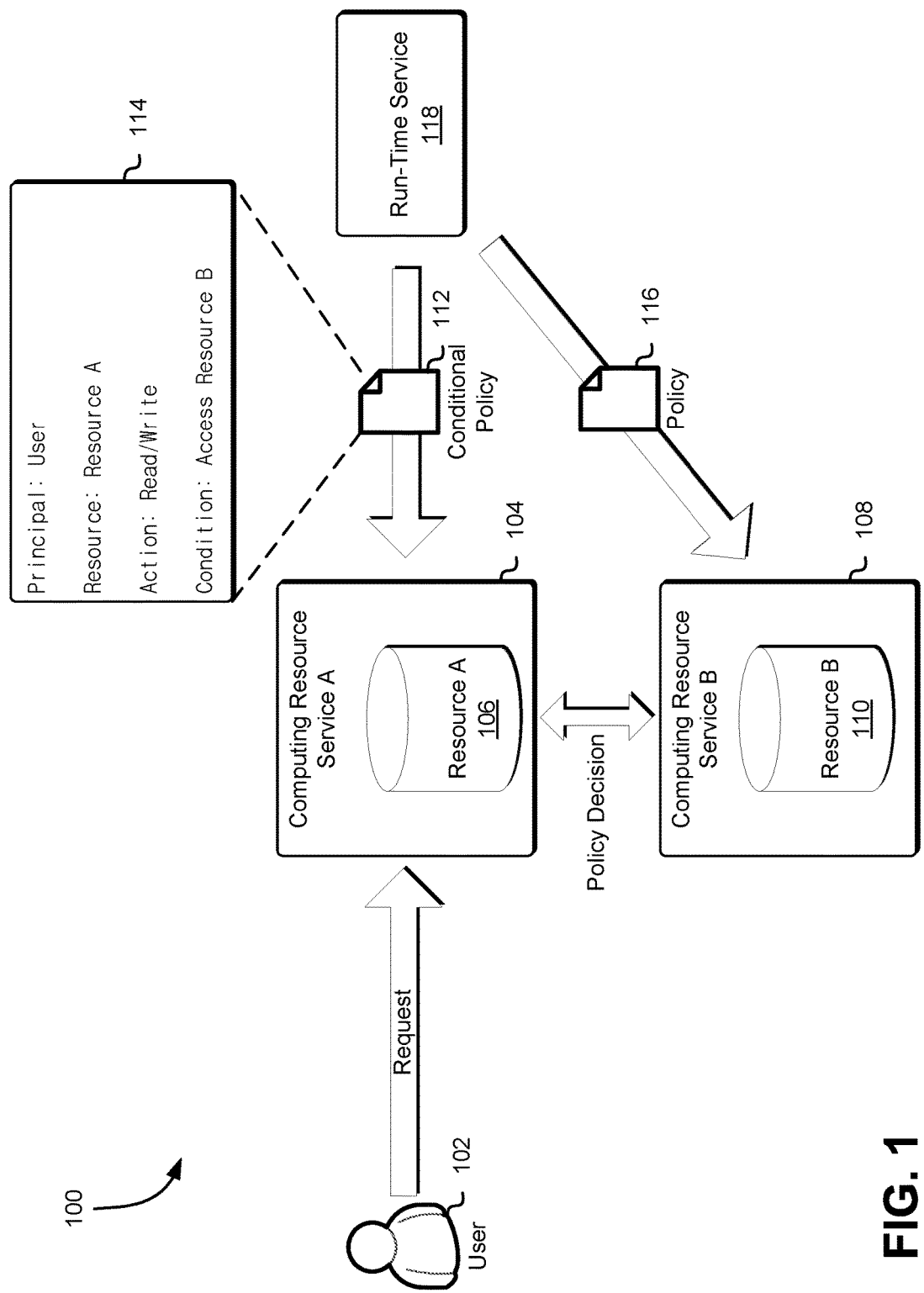
FIG. 1 shows an illustrative example of an environment in which various embodiments can be implemented.

This disclosure relates to the use of conditional computing resource policies to enable administrators of user accounts to grant access privileges to the computing resource based on a requester's access privileges to another computing resource. In an example, an administrator of a user account submits a request to a policy management service to generate a conditional computing resource policy. For the conditional policy, the administrator of the user account may specify various conditional statements that define dependency conditions with other computing resources. For instance, an administrator may specify that in order to access a computing resource that is the subject of the conditional computing resource policy, the user may be required to have certain privileges with regard to a second computing resource. As an illustrative example, if a computing resource is encrypted using a cryptographic key, any user authorized to access the computing resource may need to have access to the cryptographic key. The administrator of the user account may generate a conditional policy whereby a user may be granted access to the cryptographic key under the condition that the user also has access to the computing resource that has been encrypted using the cryptographic key. In response to the request to the policy management service, the policy management service may store the new conditional policy within a policy database where it may be accessed by various computing resource services in response to requests to access the computing resource.

In one example, in response to a request from a user to access a computing resource, the computing resource service that received the request determines which policies are applicable to the request, including any policies that may be applicable to the user, the role assumed by the user, and the computing resource itself. The computing resource service may access the policy database to obtain the identified policies applicable to the request. If the computing resource service obtains, from the policy database, a conditional computing resource policy, the computing resource service may evaluate the conditional computing resource policy to identify any dependency conditions regarding user access to other computing resources. For example, the conditional policy may specify that the user may access the computing resource if the user has also granted access to another computing resource. Based on the dependency conditions specified indicated in the conditional computing resource policy, the computing resource service may transmit a request to other applicable computing resource services or the policy database to determine whether the user is authorized to access these other computing resources as specified in the conditional computing resource policy. For example, the computing resource service may transmit a request to the policy database to obtain policy on the other resource to determine whether the user has been granted access to it.

The computing resource service may receive a response from each of the other applicable computing resource services (in the example embodiment that the computing resource service sends such requests to other services) indicating whether the user is authorized to access the other computing resources specified in the conditional computing resource policy. If the user is authorized to access these other computing resources, the computing resource service that received the request from the user to access the computing resource may determine that the dependency conditions have been satisfied and thus may allow the user to access the computing resource according to the privileges specified in the conditional computing resource policy. However, the computing resource service determines, based on the responses from the other computing resource services, that the user is not satisfied at least one of the dependency conditions specified in the conditional computing resource policy, the computing resource service may deny the user's request to access the computing resource.

In some examples, the computing resource service maintains a mapping of dependency conditions for its computing resources that can be used to determine whether a user may be granted access to a particular computing resource in response to a request from the user. For instance, a computing resource service may determine in response to provisioning of a computing resource whether the computing resource shares any dependencies with other computing resources provided by other computing resource services and the computing resource itself. Based at least in part on this determination, the computing resource service may generate a mapping that details the dependencies between the provision computing resource and any other computing resources. In response to a request from a user to access this computing resource, the computing resource service may evaluate the mapping to identify any dependencies. If there are any dependencies, the computing resource service may evaluate any policies applicable to the request as well as any policies that may be applicable to other computing resources identified in the mapping. Thus, the computing resource service may determine whether the user is authorized to access the computing resource based on not only the policies applicable to the computing resource, but any other computing resource policies applicable to other computing resources specified in the mapping as dependencies for the computing resource.

In this manner, a computing resource service may evaluate a request from a user based on policies applicable to the request itself and on whether the user satisfies any dependency conditions specified conditional computing resource policy or mapping of dependencies computing resources. In addition, the techniques described and suggested in this disclosure enable additional technical advantages. For instance, because an administrator of the user account can create a conditional computing resource policy for a particular computing resource, the administrator may no longer be required to adjust any computing resource policies for other computing resources to which a dependency may exist between the computing resource and these other computing resources. Further, because in some instances the computing resource service may maintain a mapping of the dependencies for computing resources, an administrator of the user account may create a conditional computing resource policy that specifies that the user may be required to have access to the computing resources specified in the mapping without having to create a conditional statement for each dependency.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. Computing resource policies, such as conditional computing resource policies 112 and other computing resource policies 116, are collections of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 if USER1 also has access to resource 98765. Permissions may also be associated with classes or collections of resources so that, for example, USER1 may have access to a collection of data storage devices, one of which may be resource 12345. Principals may include individual users, accounts, computing resource services, or other principal entities that are allowed or denied access to a computing resource.

In an embodiment, an administrator of a user account can generate a conditional computing resource policy 112 that includes a permission 114 that specifies one or more dependency conditions as a condition for enabling a user 102 identified as the principal to perform the one or more actions specified in the permission 114. For example, in the environment 100, the conditional computing resource policy 112 may include a permission 114 whereby the user 102 may perform read and write actions using a first computing resource 106 (e.g., Resource A) of a first computing resource service 104 (e.g., Computing Resource Service A) if user 102 has access to a second computing resource 110 (e.g., Computing Resource B). The second computing resource 110 may be maintained and provided by a second computing resource service 108 (e.g., Computing Resource Service B), as illustrated in the environment 100, although in some embodiments the second computing resource 108 may be maintained by the same computing resource service 104 or by a service that is part of a separate computing environment, such as a second computing resource service provider.

Computing resource policies, such as the conditional computing resource policy 112 and other computing resource policies 116, may be maintained by a policy management service and may be stored in a policy database. In an embodiment, a user of a customer account with privileges for modifying permissions and/or for modifying a set of policies (e.g., an administrator or such other user with privileges for modifying a set of policies, also referred to herein as a "privileged user") of an organization may communicate with the policy management service using one or more application programming interface (API) calls to request creation of policies, editing of policies, or deletion of policies. Such policy modification activities (e.g., creating and editing) may also be referred to herein as "authoring" a policy. The policies may, for example, be utilized to establish, for one or more users 102 of the customer account, a level of access to one or more resources provisioned by or for the organization and, generally, access rights with respect to the one or more resources provisioned by/for the organization. The organization may be a user of a computing resource service provider that utilizes one or more services such as a virtual computer system service, object-based data storage services, database services, a policy management service and configuration and management service as well as a plurality of other services to create and manage resources and to support operational needs.

Computing resource policies may be authored in a default state such as, for example, denying all access or granting all access. Computing resource policies may also be authored based on organizational business needs and/or may be based on roles within that organization so that, for example, all software developers have the same computing resource policy. Computing resource policies may also be authored based on the state of a computer system such that, for example, a policy may grant permission to access an enumerated set of resources that existed when the policy was authored. Such authored policies may not be optimal, ideal, or efficient because they may be under-inclusive (i.e., the policy does not include one or more necessary permissions), they may be over-inclusive (i.e., the policy includes one or more unnecessary permissions), they may be overly simple (i.e., with only a few divisions of roles), they may be overly complex (i.e., with separate permissions for each combination of user, resource, and action), or they may be inefficient or sub-optimal for some other reason.

In the environment 100, a user 102 of a customer account submits a request to the first computing resource service 104 to perform one or more actions using a first computing resource 106 provided by the computing resource service 104. In response to the request transmitted from the user 102, the computing resource service 104, through a run-time service 118, submits a request to the policy management service to obtain any policies associated with a principal and the corresponding account. The policy management service 106 may identify the policies that are applicable to the principal and the corresponding account, including any conditional computing resource policies 112, and provide these policies to the computing resource service 104 for processing. The computing resource service 104 may determine whether a conditional computing resource policy 112 has been provided that is to be used for the request from the user 102.

As described above, the conditional computing resource policy 112 may include a permission 114 that defines, through a conditional statement of the permission 114, a dependency with one or more other computing resources 110 provided by the computing resource service 104 or a different computing resource service 108. The first computing resource service 104 may evaluate the conditional computing resource policy 112 and identify the one or more other computing resources 110 for which the user 102 may be required to have access in order to be granted access to the computing resource 106. The first computing resource service 104 may transmit a request to other computing resource services 108 that may include the one or more other computing resources 110 specified in the permission 114 to determine whether the user 102 is authorized to access the one or more other computing resources 110.

As an illustrative example, computing resource 106 may be a cryptographic key that can be used to decrypt data stored in computing resource 110. The conditional computing resource policy 112 applicable to the computing resource 106 may indicate, as a condition, that the user 102 has to have at least read access to the computing resource 110 in order to be granted access to the computing resource 106. Based at least in part on the condition specified in the permission 114 of the conditional computing resource policy 112, the computing resource service 104 may transmit a request to the other computing resource service 108 to determine whether the user 102 is authorized to read data stored in computing resource 110.

In response to the request from the first computing resource service 104, the second computing resource service 108 may, through a run-time service 118, submit a request to the policy management service to obtain any policies 116 associated with the principal and the corresponding account. The second computing resource service 108 may evaluate any obtained policies 116 that are applicable to the computing resource 110 and the user 102 to determine whether the user 102 is authorized to perform the actions specified in the permission 114 of the conditional computing resource policy 112. Based at least in part on these one or more policies 116, the second computing resource service 108 may determine a policy decision for the user 102 and the computing resource 110. The second computing resource service 108 may transmit this policy decision to the computing resource service 104 to fulfill the request.

In an alternative embodiment, the computing resource service 104 generates a request that includes context from the original request from the user 102 (e.g., user identifier, Internet Protocol address of a user client utilized by the user 102, etc.) to access the second computing resource 110. The computing resource service 104 may submit this request to the run-time service 118 to obtain any policies 116 that may be applicable to this request, such as any policy that is associated with the user as well as the second computing resource 110. The computing resource service 104 may use these policies 116, in addition to the conditional policy 112 and other policies applicable to the original request from the user 102, to determine whether the user 102 is authorized to access the computing resource 106. Alternatively, the computing resource service 104 may encapsulate the original request from the user 102 within a new request, generated by the computing resource service 104, for access to a second computing resource 110 as specified in the conditional policy 112. The computing resource service 104 may obtain policies applicable to the new request and obtain a policy decision. The computing resource service 104 may examine the encapsulated policy according to the applicable policies for the original request and the policy decision to determine whether the user 102 is authorized to access the computing resource 106.

In some embodiments, the computing resource service 104 maintains a mapping of computing resource dependencies between its computing resources 106 and computing resources 110 maintained by other computing resource services 108. For instance, an administrator of a user account may access the computing resource service 104 to provision a computing resource 106. The administrator may specify, in its request to provision the computing resource 106, that the computing resource 106 may only be accessed by a user 102 if the user 102 has certain access privileges to other computing resources provided by the computing resource service 104 or computing resources 110 provided by other computing resource services 108. The computing resource service 104 may identify any policies applicable to the newly provisioned computing resource 106 and modify the policies to include, within each permission 114, that there is a dependency between the computing resource 106 and other computing resources 110 as identified by the administrator of the user account. In an alternative embodiment, the computing resource service 104 evaluates the mapping of dependencies as it evaluates the obtained one or more policies in response to a user 102 request to determine whether a dependency exists for the computing resource 106. If so, the computing resource service 104 may transmit a request to other computing resource services 108 to obtain a policy decision for each dependency specified in the mapping.

Based at least in part on the policy decision obtained from the computing resource service 108, the computing resource service 104 may determine whether the user 102 satisfies the one or more conditions specified in the permission 114 of the conditional computing resource policy 112. For instance, if the computing resource service 104 determines, based at least in part on the policy decision from the computing resource service 108, that the user 102 does not satisfy the one or more conditions specified in the permission 114 of the conditional computing resource policy 112, the computing resource service 102 may deny the user's request to access the computing resource 106. However, if the user 102 satisfies the one or more conditions specified in the permission 114 of the conditional computing resource policy 112, the computing resource service 104 may determine, subject to any other policies applicable to request, that the user 102 is authorized to access the computing resource 104.

In some embodiments, the Internet protocol (IP) address of the user 102 is whitelisted with regard to computing resource 110 to which a dependency may exist as defined in the permission 114 of the conditional computing resource policy 112 for computing resource 106. The request from computing resource service 104 may include the user's IP address and any other information that can be used to determine whether the user 102 has been whitelisted for access to computing resource 110, thus obviating the need to obtain the one or more computing resource policies 116 from the run-time service 118. In response to the request from the computing resource service 104 to obtain a policy decision with regard to a user's authorization to access the computing resource 110, the computing resource service 108 may determine whether the user's IP address has been previously whitelisted for accessing the computing resource 110. If so, the computing resource service 108 may transmit a policy decision to computing resource service 104 that specifies that the user 102 has been whitelisted for access to computing resource 110. However, if the user 102 has not been whitelisted, the computing resource service 108 may obtain the one or more applicable computing resource policies 116 from the run-time service 118 and utilize these policies 116 to make a policy decision for the user 102.

Figure 2:
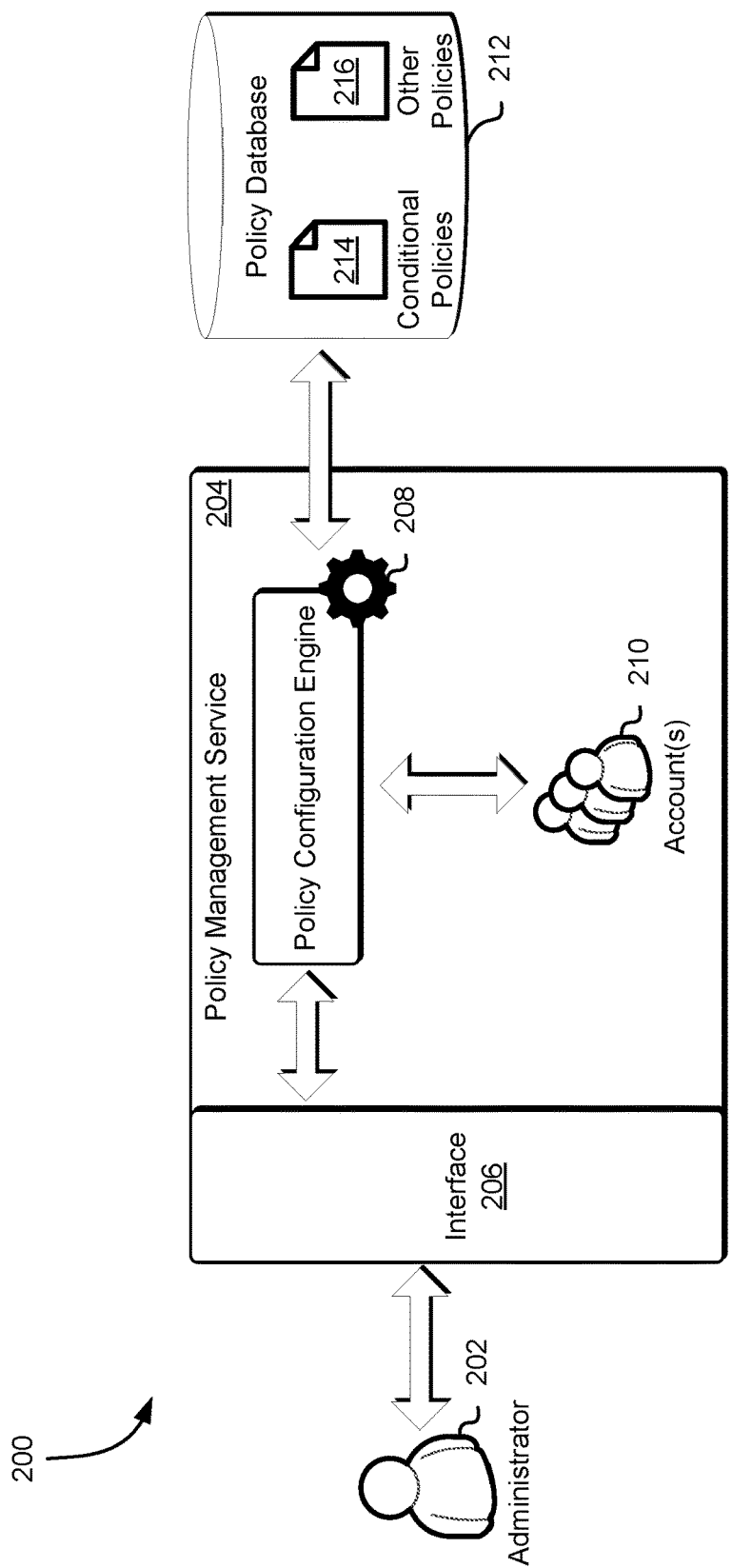
FIG. 2 shows an illustrative example of an environment in which an administrator of the user account accesses a policy management service to generate one or more conditional computing resource policies in accordance with at least one embodiment.

As noted above, an administrator of the user account may access a policy management service to request creation of a conditional computing resource policy that may define a level of access to one or more computing resources subject to one or more conditions premised on dependencies between the one or more computing resources and a level of access to other computing resources. Accordingly, FIG. 2 shows an illustrative example of an environment 200 in which an administrator 202 of the user account accesses a policy management service 204 to generate one or more conditional computing resource policies 214 in accordance with at least one embodiment. In the environment 200, an administrator 202 of a user account may access an interface 206 of the policy management service 204 to request creation of a conditional computing resource policy 214 that may be applied to incoming requests to access particular computing resources or that may be applied to specific users.

Through the interface 206, the administrator 202 may identify the one or more computing resources that have been provisioned or are otherwise maintained for a particular user account. For instance, in response to detection of an administrator 202 having accessed the interface 206, a policy configuration engine 208 of the policy management service 204 may access an accounts datastore 210 to obtain information specified in a user account managed by the administrator 202. The information may include the one or more computing resources that have provisioned or otherwise maintained for the account, as well as users, groups, and roles of the user account 210. The policy configuration engine 208, which may include one or more computing systems for the management and creation of the computing resource policies, may update the interface 206 to provide the information from the user account to the administrator 202. For example, the interface 206 may include a graphical user interface (GUI) that may be used to display the information for the administrator 202.

The administrator 202 may use the interface 206 to define dependencies among the various computing resources that may be linked to the user account. Further, through the interface 206, the administrator 202 may define one or more conditions for enabling a user of the user account to access a particular computing resource. The policy configuration engine 208 may evaluate the administrator's input into the interface 206 to identify how the conditions are to be implemented among the various computing resource services through which the computing resources for the user account 210 are maintained. The policy configuration engine 208 may update the interface 206 to denote the effect of a particular condition applied to a user and the corresponding dependencies. This may allow the administrator 202 to evaluate the effect of a proposed condition or a policy prior to the implementation of that policy. In some instances, the policy configuration engine 208 may also provide the administrator 202 with a draft of a policy that is to be implemented in response to the administrator's request. Through the interface 206, the administrator 202 may modify the draft of the policy, which may result in the policy configuration engine 208 updating the interface 206 to display the effect of these modifications as it relates to the user, the computing resources, and the dependencies among these computing resources.

If the administrator 202 evaluates the draft of the conditional computing resource policy and the mapping of the dependencies presented through the interface 206, the administrator 202 may submit a request to the policy configuration engine 208 to implement a conditional computing resource policy. In response to the request, the policy configuration engine 208 may access the user account, through the accounts datastore 210, to associate this newly created conditional computing resource policy with the user account, users of the user accounts, and/or computing resources specified in the policy. Further, the policy configuration engine 208 may store the new conditional computing resource policy with other conditional computing resource policies 214 that may specify conditions that may are to be satisfied based at least in part on the dependency conditions specified therein. The policy database 212 may be a storage repository or datastore for the conditional computing resource policies 214 as well as for other computing resource policies 216 that may not specify conditions for providing users with a level of access to particular computing resources. This policy database 212, as will be described below, may be accessed by computing resource services to obtain the policies applicable to incoming requests from users to access the computing resources.

Figure 3:
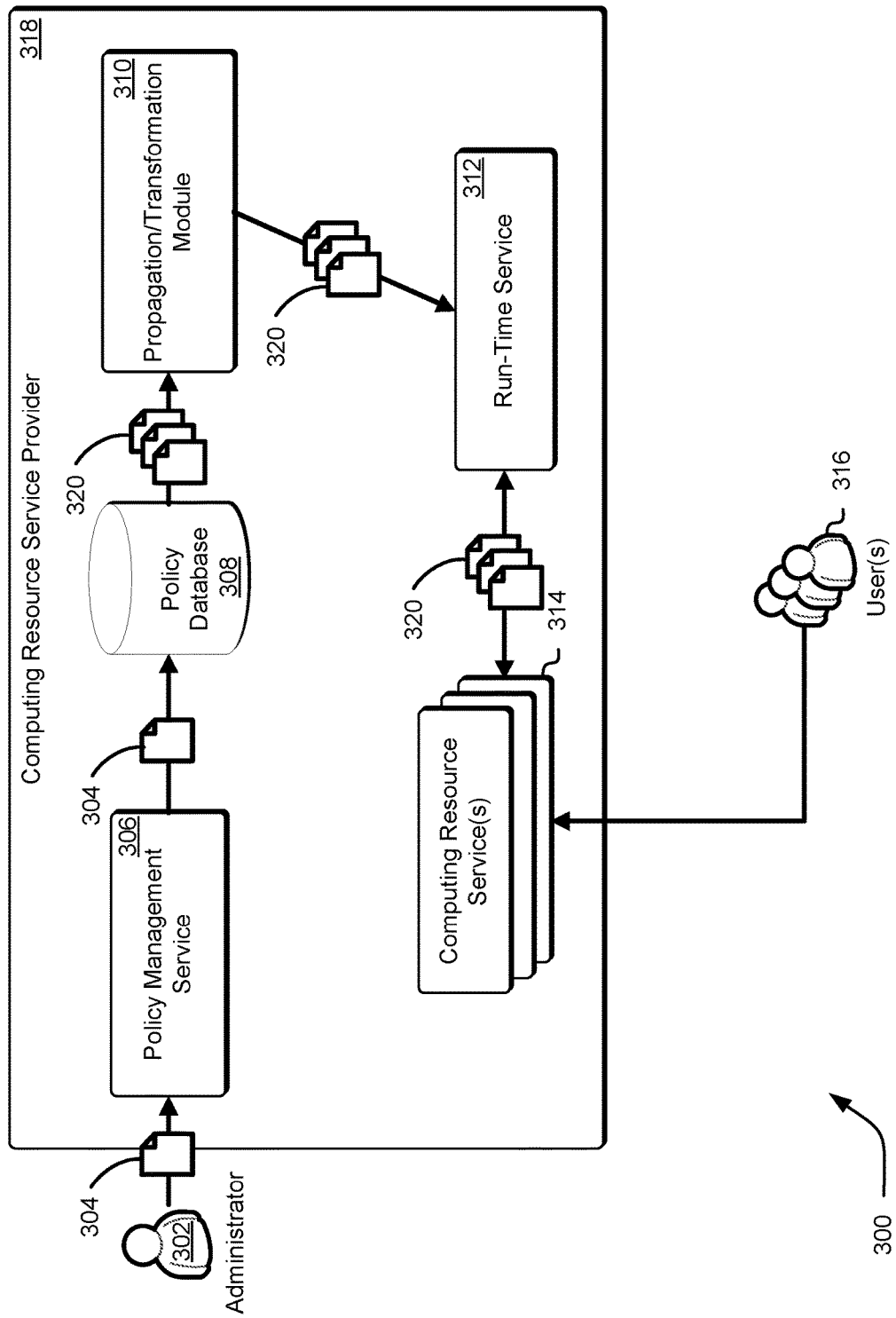
FIG. 3 shows an illustrative example of an environment in which a conditional computing resource policy is obtained along with other computing resource policies through one or more components of a computing resource service provider to determine whether a user is authorized to access the computing resource in accordance with at least one embodiment.

As noted above, an administrator of a user account may access a policy management service to establish one or more conditional computing resource policies that may be applicable to requests from users to access computing resources through the user account. The conditional computing resource policies may specify various dependency conditions between the computing resource specified in the policy and other computing resources specified in the one or more conditions of the policy. In response to a request from a user to access a particular computing resource, a computing resource service may obtain the conditional computing resource policy, along with any other applicable computing resource policies and, based at least in part on the specified dependency conditions, determine whether the user is authorized to access the computing resource specified in the user's request. Accordingly, FIG. 3 shows an illustrative example of an environment 300 in which a conditional computing resource policy 304 is obtained along with other computing resource policies through one or more components of a computing resource service provider to determine whether a user is authorized to access the computing resource in accordance with at least one embodiment.

In the environment 300, an administrator 302 or privileged user of a customer account (e.g., policy owner) may access a policy management service 306 provided by a computing resource service provider 318 to request creation of a new conditional computing resource policy 304. For instance, the policy management service 306 may include an interface, such as a GUI, which may be used to specify the one or more parameters of the conditional computing resource policy 304. Alternatively, the policy owner may transmit one or more API calls to the policy management service 306 to request creation of the conditional computing resource policy 304. The request may further specify one or more target users 316, groups, roles, and computing resources that are to be associated with the conditional computing resource policy 304 once the policy has been created. In some instances, the administrator 302 can also define any dependency conditions between the computing resource specified in the conditional computing resource policy 304 and other computing resources specified in the conditional statements of the policy 304. These dependency conditions may be stored by the policy management service 306 in the form of a mapping of dependencies that may be provided to computing resource services 314.

The policy management service 306 may generate the conditional computing resource policy 304 in response to the request within a policy database 308. The policy database 308 may be a relational database that may be used to store the conditional computing resource policy 304. For instance, the policy database 308 may be used to store metadata about the conditional computing resource policy 304 (e.g., name of the conditional computing resource policy 304, a policy owner identifier, when the conditional computing resource policy 304 was generated, dependency conditions specified in the conditional computing resource policy 304, etc.). In response to a new conditional computing resource policy 304 being created, the policy management service 306 may update this relational database table to include the conditional computing resource policy 304. The policy database 308 may further store other computing resource policies applicable to users 316, roles, groups, and computing resources provided by the computing resource service provider 318 through the one or more computing resource services 314. These other computing resource policies may not specify dependency conditions among computing resources through conditional statements, such as those in the conditional computing resource policy 304. The policy database 308 may include an additional relational database table corresponding to the various users and accounts associated with the computing resource service provider 318. This table may specify user and account metadata, such as identifiers for the users and accounts, contact information, associated resources, and the like.

Once the conditional computing resource policy 304 has been generated by the policy management service 306 through use of the policy database 308, a propagation/transformation module 310 may obtain information regarding the conditional computing resource policy 304 or the conditional computing resource policy 304 itself from the policy database 308. The propagation/transformation module 310 may be a computer system of the policy management service 306, a separate computer system of the computing resource service provider 318, or one or more applications associated with either of these computer systems, that transforms data from the policy database 308 into data that may be stored within a run-time database which is stored within a key-value store that exists on each physical host and that may be accessed by a run-time service 312. For instance, the propagation/transformation module 310 may store each conditional computing resource policy 304 and other computing resource policies (collectively referred to as policies 320) as a unique identifier within the run-time database. This unique identifier may serve as the key in the key-value store. The propagation/transformation module 310 may further store in the run-time database a mapping of dependencies for each conditional computing resource policy.

The information collected by the propagation/transformation module 310 may be transmitted to a run-time service 312, which may include one or more computer systems that are responsible for delivering run-time policies to the individual computing resource services 314 as these computing resource services 314 submit requests to determine whether a particular user 316 is authorized to perform one or more actions through these services 314. For instance, in response to a request from a user 316 associated with a particular account to access a particular resource of a computing resource service 314, the computing resource service 314 may transmit a request to the run-time service 312 to identify any policies 320 that may be applicable to the account that the user 316 is a part of. The run-time service 312 may respond to the requesting computing resource service 314 by providing the one or more identified policies 320 to the requesting computing resource service 314. In some embodiments, the relevant policies can be cached within each of the computing resource services 314 as they are received. If any of the relevant policies are not cached, the computing resource service 314 may transmit another request to the run-time service 312 to obtain the needed policies 320 to determine whether the user is authorized to perform the requested actions.

In response to the request from a user 316 to access a particular computing resource, the run-time service 312 may access the run-time database to identify any policies 320, including any conditional computing resource policies 304, that are applicable to the user. Further, the run-time service 312 may transmit a request to the propagation/transformation module 310 to obtain any policies 320 not cached by the run-time service 312. The propagation/transformation module 310 may obtain the needed policies 320 from the policy database 308 and provide these policies 320 to the run-time service 312 to fulfill the request. The run-time service 312, in turn, may provide the policies 320 to the computing resource service 314, which may store the policies 320 in its cache. The computing resource service 314 may utilize the policies 320 to determine whether the user 316 may perform the one or more requested actions on the targeted computing resource.

In an embodiment, if the one or more policies 320 applicable to the request from the user 316 include a conditional computing resource policy 304 that specifies one or more computing resource dependency conditions, the computing resource service 314 will evaluate the conditional computing resource policy 304 to identify one or more other computing resources to which a user 316 may be required to have access as a condition for enabling the user 316 to perform the requested actions. Based at least in part on the identified dependency conditions specified in the conditional computing resource policy 304, the computing resource service 314 may submit a request to each computing resource service that includes a computing resource specified in the dependency conditions to determine whether the user 316 is authorized to access the computing resource specified in the dependency conditions according to the condition specified in the conditional computing resource policy 304. In response to this request, the other computing resource service may obtain a set of policies applicable to the request (e.g., policies applicable to a request from the user 316 to access the computing resource specified in the dependency conditions). The other computing resource service may evaluate the request against this set of policies to generate a policy decision that may be provided to the computing resource service 314 in response to its request.

The computing resource service 314 may evaluate the policy decision from each of the other computing resource services to determine whether the user 316 is authorized to access the other computing resources specified as part of the dependency conditions in the conditional computing resource policy 304. If the user 316 does not satisfy the authorization requirements for these dependency conditions, the computing resource service 314 may deny the user's request to access the computing resource. However, if the computing resource service 314 determines that the user 316 satisfies the authorization requirements for these dependency conditions, the computing resource service 314 may, subject to any other computing resource policies that may be applicable to the request, allow the user 316 to access the computing resource and perform operations in accordance with the computing resource policies 320 applicable to the request.

It should be noted that while the one or more computing resource services 314 are shown as being part of the computing resource service provider 318 for the purpose of illustration, one or more of the computing resource services 314 may be provided by other service providers operating within networks other than the computing resource service provider network. For instance, the computing resource service may evaluate a conditional computing resource policy 304 that specifies one or more computing resource dependency conditions to identify one or more computing resources maintained by a different service provider to which a user 316 may be required to have access as a condition for enabling the user 316 to perform the requested actions. The computing resource service may transmit a request to the other service provider to determine whether the user 316 is authorized to access these one or more computing resources. The request to the other service provider may be formatted to mirror a request that would come from the user 316. Thus, the computing resource service 314 may obtain the policies applicable to the request or a policy decision that can be used to determine whether the user 316 satisfies the dependency condition.

Figure 4:
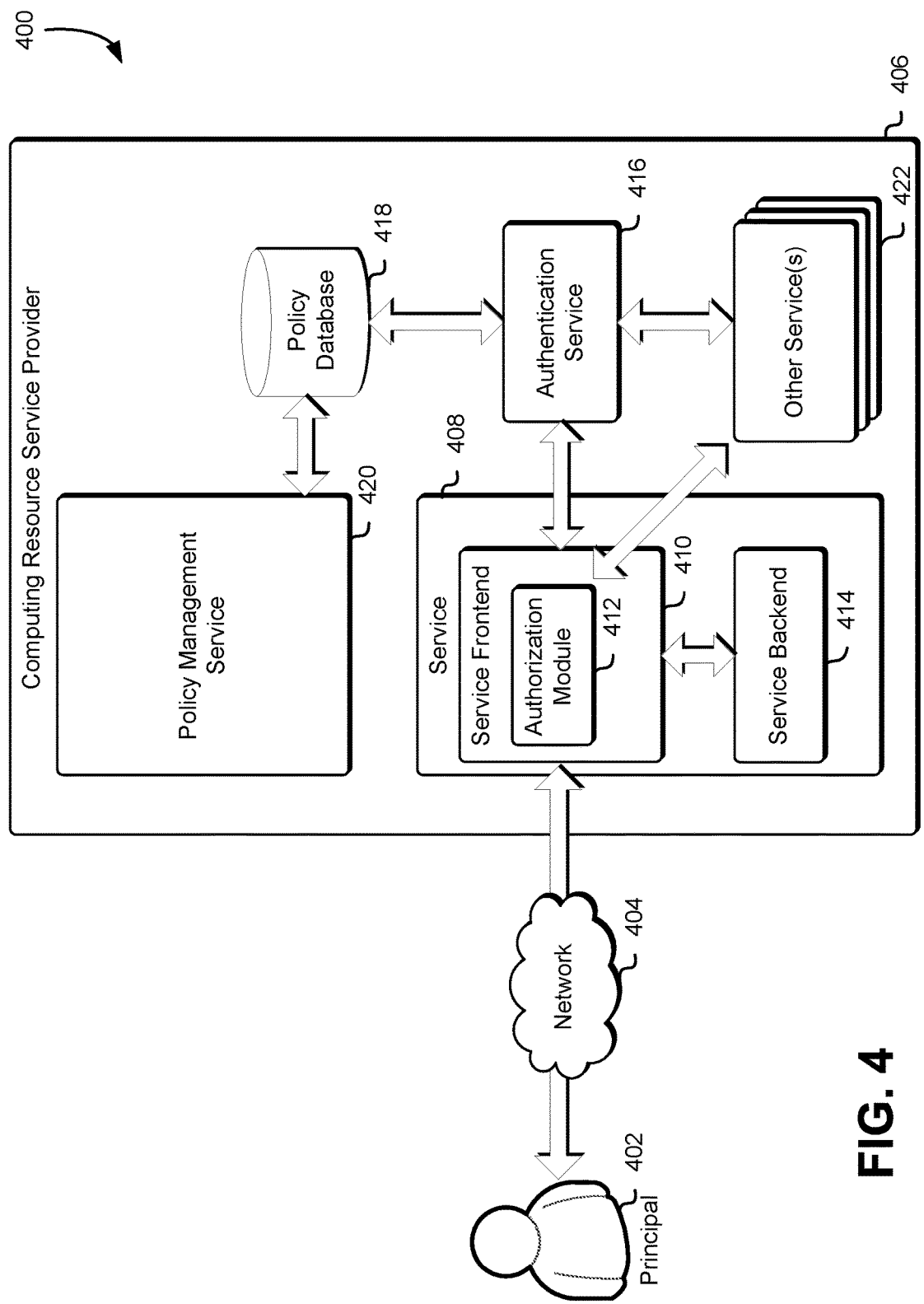
FIG. 4 shows an illustrative example of an environment in which conditional computing resource policies and other computing resource policies may be managed in accordance with at least one embodiment.

FIG. 4 shows an illustrative example of an environment 400 in which conditional computing resource policies and other computing resource policies may be managed in accordance with at least one embodiment. In an embodiment, a principal 402 may use a computing device to communicate over a network 404 with a computing resource service provider 406. Communications between the computing resource service provider 406 and the principal 402 may, for instance, be for the purpose of accessing a service 408 operated by the computing resource service provider 406, which may be one of many services operated by the computing resource service provider 406. The service 408 may comprise a service frontend 410 and a service backend 414. The principal 402 may issue a request for access to a service 408 (and/or a request for access to resources associated with the service 408) provided by a computing resource service provider 406. The request may be, for instance, a web service application programming interface request. The principal may be a user, or a group of users, or a role associated with a group of users, or a process representing one or more of these entities that may be running on one or more remote (relative to the computing resource service provider 406) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 402 may communicate with the computing resource service provider 406 via one or more connections (e.g., transmission control protocol (TCP) connections). The principal 402 may use a computer system client device to connect to the computing resource service provider 406. The client device may include any device that is capable of connecting with a computer system via a network, such as example devices discussed below. The network 404 may include, for example, the Internet or another network or combination of networks discussed below.

The computing resource service provider 406, through the service 408, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 408 may be received by a service frontend 410, which, in some examples, comprises a web server configured to receive such requests and to process them according to one or more policies associated with the service 408. The request for access to the service 408 may be a digitally signed request and, as a result, may be provided with a digital signature. The service frontend 410 may then send the request and the digital signature for verification to an authentication service 416. The authentication service 416 may be a stand-alone service or may be part of a service provider or other entity. The authentication service 416, in an embodiment, is a computer system configured to perform operations involved in authentication of principals. In some examples, requests submitted to the service frontend 410 are digitally signed by the principal (i.e., by a computing device used by or operating on behalf of the principal) using a symmetric cryptographic key that is shared between the principal 402 and the authentication service 416. The authentication service, therefore, may use a copy of the symmetric cryptographic key to verify digital signatures of requests purported to have been generated by the principal 402. However, in other embodiments, the authentication service 416 may be configured to utilize asymmetric cryptography for digital signature verification such as, for example, in response to the principal digitally signing requests using a private cryptographic key. In such embodiments, the authentication service may be configured to trust a certificate authority that digitally signed a certificate of the principal 402 corresponding to the private cryptographic key. Consequently, in some embodiments, the authentication service may use a public cryptographic key specified by the certificate.

Upon successful authentication of a request, the authentication service 416 may then obtain policies applicable to the request. A policy may be applicable to the request by way of being associated with the principal 402, a resource to be accessed as part of fulfillment of the request, a group in which the principal 402 is a member, a role the principal 402 has assumed, and/or otherwise. To obtain policies applicable to the request, the authentication service 416 may transmit a query to a policy database 418 managed by a policy management service 420, which may be the policy management service discussed above in connection with FIG. 3. The policy management service 420 may also identify any conditional computing resource policies by transmitting a query to the policy database 418.

The query to the policy database 418 may be a request comprising information sufficient to determine a set of policies applicable to the request, including any conditional computing resource policies that may specify one or more dependency conditions to other computing resources and policies applicable to these other computing resources. The query to the policy database may, for instance, contain a copy of the request and/or contain parameters based at least in part on information in the request, such as information identifying the principal, the resource, and/or an action (operation to be performed as part of fulfillment of the request). The policy database 418 may be a database or other system operable to process queries. The policy database 418 may process queries by providing records and/or other such data applicable to the request and/or responsive to the queries. Note that, if authentication of the request is unsuccessful (e.g., because a digital signature could not be verified), policies applicable to the request and/or usage data associated with the policy may not be provided to the requester.

Having obtained any policies applicable to the request, the authentication service 416 may provide an authentication response and, if applicable, the obtained policies back to the service frontend 410. The authentication response may indicate whether the response was successfully authenticated. The service frontend 410 may then check whether the fulfillment of the request for access to the service 408 would comply with the obtained policies using an authorization module 412. An authorization module 412 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 412 is not able to match the request to a permission specified by the policy, the authorization module 412 may execute one or more default actions such as, for example, providing a message to the service frontend that causes the service frontend to deny the request, and causing the denied request to be logged in the policy management service 420. If the authorization matches the request to one or more permissions specified by the policy, the authorization module 412 may resolve this by selecting the least restrictive response (as defined by the policy) and by informing the service frontend whether the fulfillment of the request is authorized (i.e., complies with applicable policy) based on that selected response. The authorization module 412 may also by select the most restrictive response or may select some other such response and inform the service frontend whether the fulfillment of the request is authorized based on that selected response. Note that, while FIG. 4 shows the authorization module 412 as a component of the service frontend 410, in some embodiments, the authorization module 412 is a separate service provided by the computing resource service provider 406 and the frontend service may communicate with the authorization module 412 over a network.

In an embodiment, the authorization module 412 evaluates the one or more computing resource policies obtained from the authentication service 416 to determine whether any of the provided policies are conditional computing resource policies. A conditional computing resource policy may include a condition that specifies one or more dependency conditions to other computing resources maintained by the service 408 or other computing resource services 422 of the computing resource service provider 406. For instance, a dependency specified as a condition in the conditional computing resource policy may indicate that a principal 402 is required to have a certain level of access to another computing resource in order for the principal 402 to be granted a level of access according to the policy. If the computing resource specified in the dependency is maintained by another computing resource service 422, the authorization module 412 may transmit a request to the other computing resource service 422 to determine whether the principal 402 is authorized to access the computing resource and has at least a level of access specified in the dependency.

In response to the request from the authorization module 412, the other computing resource service 422 may obtain, from the authentication service 416, any policies applicable to the request from the authorization module. The other computing resource service 422 may include its own authorization module, which may evaluate the obtained policies to generate a policy decision regarding the level of access a principal 402 may have for the specified computing resource. The policy decision may specify whether the principal 402 is authorized to perform the actions specified in the request from the authorization module 412 and required through the dependency specified in the conditional computing resource policy. It should be noted that while the policy decision may be generated by the other computing resource service 422, the other computing resource service 422 may alternatively provide the applicable policies to the authorization module 412 to enable the authorization module 412 to generate the policy decision. As another alternative, the authorization module 412 may obtain the applicable policies for the dependency directly from the authentication service 416 without need to transmit a request to the other computing resource service 422 to obtain the policy decision.

In an embodiment, the authorization module 412 obtains a mapping of dependencies from the authentication service 416 and generated by the policy management service 420 in response to administrator requests to create conditional computing resource policies. The mapping of dependencies may specify the various dependencies among computing resources of the service 408 and other computing resource services 422 provided by the computing resource service provider 406. The authorization module 412 may evaluate the mapping of dependencies in response to the request from the principal 402 to identify any dependencies that need to be evaluated to determine whether the request may be fulfilled. Thus, using the policies obtained from the authentication service 416 and the mapping of dependencies, the authorization module 412 may determine the level of access for the principal 402 and obtain policy decisions from other computing resource services 422 as identified in the mapping.

Figure 5:
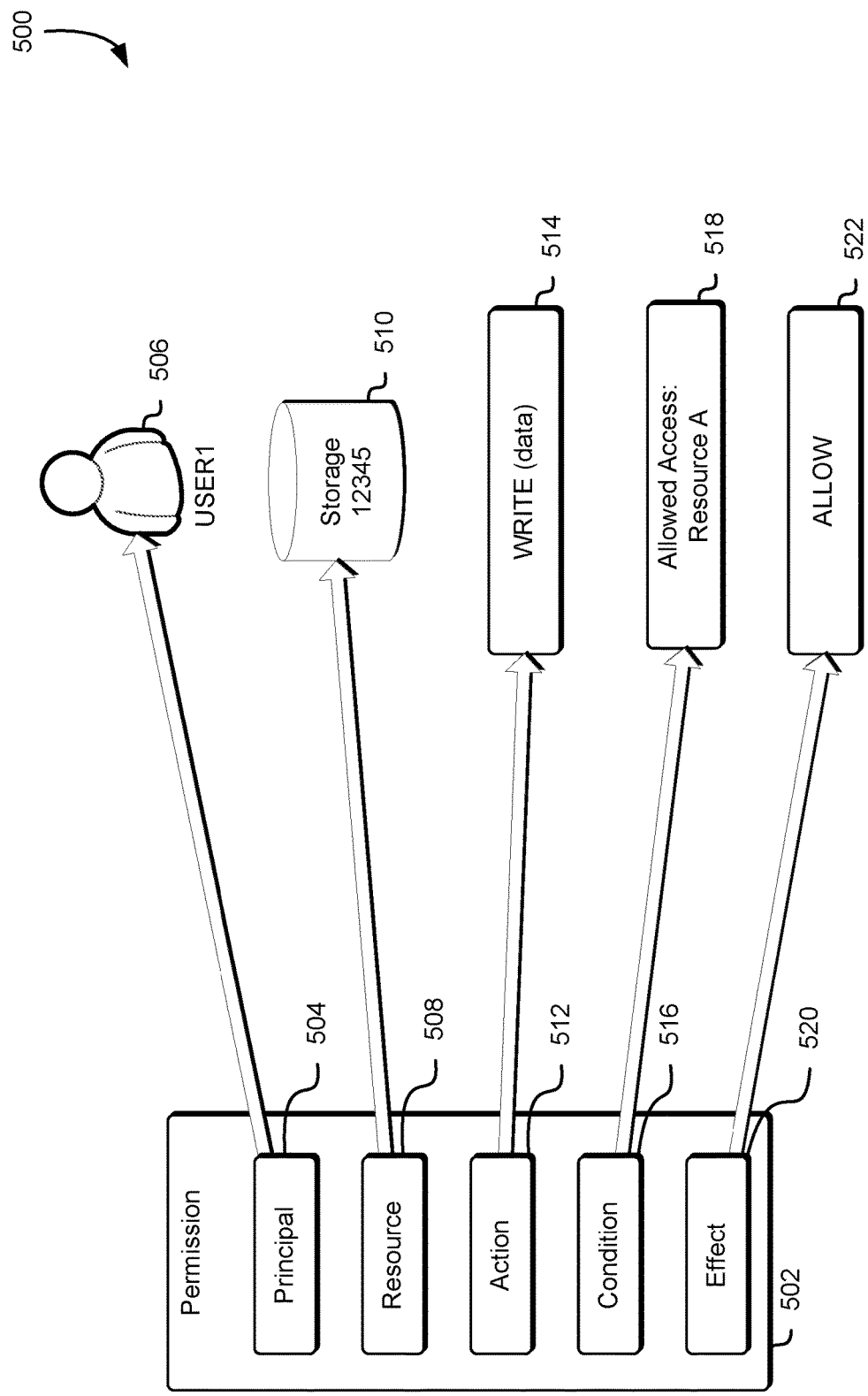
FIG. 5 shows an illustrative example of a diagram in which a permission associated with the computing resource policy as illustrated in accordance with at least one embodiment.

FIG. 5 shows an illustrative example of a diagram 500 in which a permission associated with the computing resource policy as illustrated in accordance with at least one embodiment. In an embodiment, a permission 502 may specify a principal 504, a resource 508, an action 512, a condition 516, and an effect 520. In some embodiments, a permission may also specify a plurality of one or more of these elements such as, for example, a set or class of users, a collection of resources, several different actions, and/or multiple conditions. In some embodiments, the permission 502 may specify one or more wildcard or otherwise modifiable characters that may be used to denote that the permission 502 may be modified to make the permission 502 applicable to different users and their associated resources.

The principal 504 may be a user, a group, an organization, a role, or a collection and/or combination of these or other such entities. A principal 504 may be any entity that is capable of submitting API calls that cause an action associated with a resource to be performed and/or any entity to which permissions associated with a resource may be granted. In the example permission 502 illustrated in FIG. 5, the principal 504 is a user 506 identified as "USER1." The action 512 may be any action that may be performed in association with the resource and may, for example, be identified by a type of API call, a library call, a program, process, series of steps, a workflow, or some other such action. For example, an action may be a set of operations that may be performed as part of the fulfillment of an API call to, for example, a web service. The actions that are performed may be a subset of those actions and/or may be a single operation. The operations may also be performed in a defined order, may be repeated, or may be shared between a plurality of API calls. In the example permission 502 illustrated in FIG. 5, the action is an API call to write data to the resource. The permission 502 illustrated in FIG. 5 may be one of a plurality of permissions specified by user policy permissions. The example permission 502 illustrated in FIG. 5 further specifies a storage resource 510 for the resource 508, a data write API call 514 for the action 512, a dependency 518 for the condition 516, and an ALLOW effect 522 for the effect 520. The example permission thus specifies that "USER1 is ALLOWED to WRITE to 12345 if ALLOWED ACCESS TO RESOURCE A."

In an embodiment, if the condition 516 of the permission 502 is a dependency, a computing resource service evaluating the permission 502 will identify the target computing resource specified in the dependency and the level of access for the computing resource required for the principal 504 in order to satisfy the condition 516. The computing resource service evaluating the permission 502 may transmit a request to the service that maintains the computing resource identified in the dependency to determine whether the principal 504 has the required level of access to the computing resource as specified in the condition 516. If the principal 504 does have the required level of access, the computing resource service may evaluate the action 512 and effect 520 of the permission 502 to determine the level of access to the resource 508 identified in the permission 502.

Figure 6:
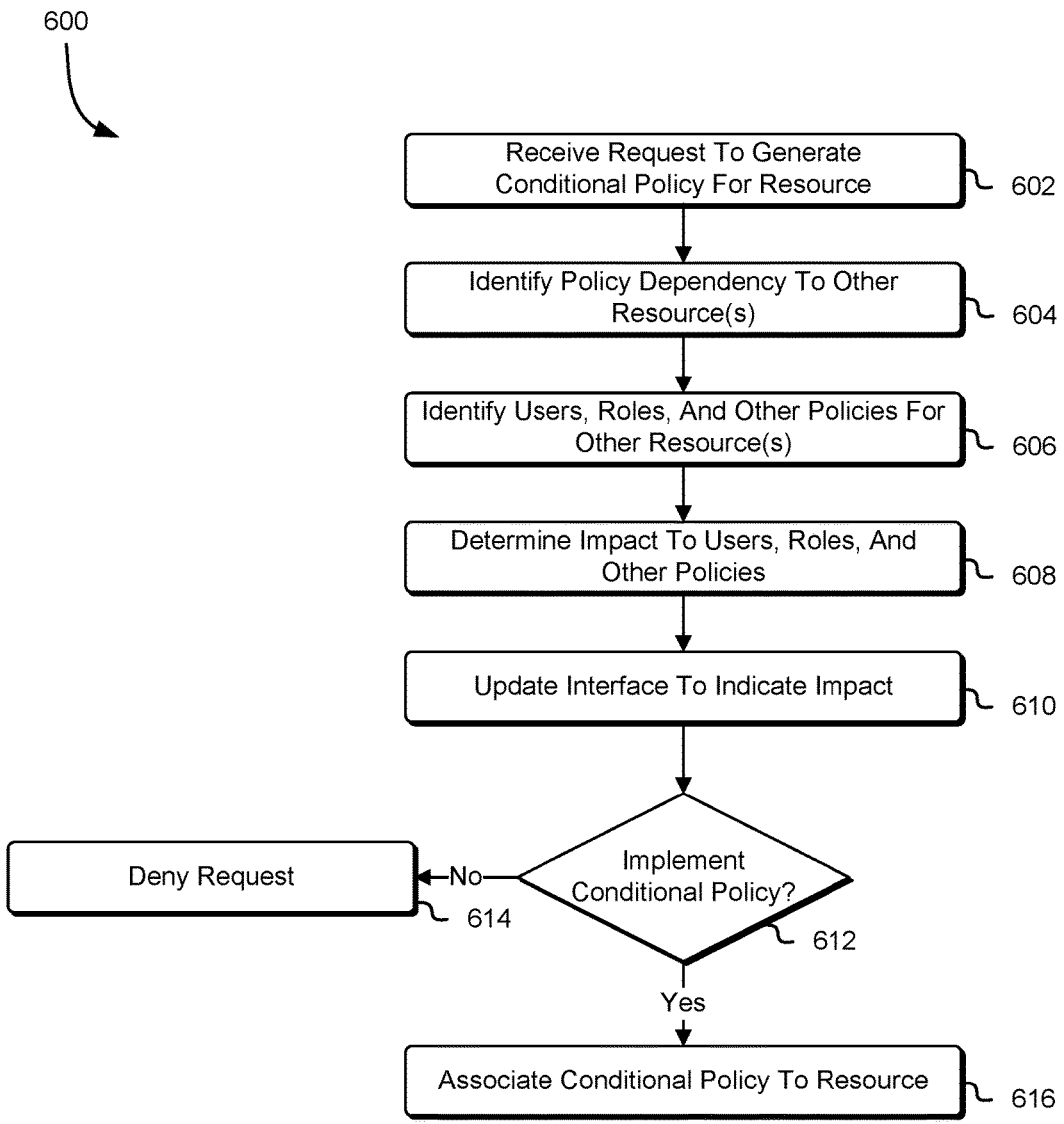
FIG. 6 shows an illustrative example of a process for implementing a conditional computing resource policy in response to a request from an administrator of a user account in accordance with at least one embodiment.

As noted above, an administrator of a user account may transmit a request to a policy management service to generate a conditional computing resource policy. The conditional computing resource policy may include one or more dependency conditions to other computing resources that may need to be satisfied as a condition to granting a level of access to a specified computing resource to a principal identified in the policy. Accordingly, FIG. 6 shows an illustrative example of a process 600 for implementing a conditional computing resource policy in response to a request from an administrator of a user account in accordance with at least one embodiment. The process 600 may be performed by the aforementioned policy management service, which may provide an interface to administrators of user accounts to define conditional computing resource policies. Further, the policy management service may furnish these conditional computing resource policies to computing resource services through a policy database.

At any time, the policy management service may receive 602 a request, from an administrator of a user account, to generate a conditional computing resource policy for a particular computing resource. The policy may specify a principal such as a user, a group, an organization, a role, or a collection and/or combination of these or other such entities for whom this new policy may be applicable. Additionally, the administrator of the user account may utilize an interface provided by the policy management service to identify the target computing resources for the new policy. In an embodiment, the policy management service provides a GUI to the administrator, which may illustrate the various computing resources available to the administrator and users of the user account, as well as any relationship among the various computing resources available to the account. Through this GUI, the administrator may define one or more dependencies among its computing resources. The policy management service may use the inputs to the GUI and the specified target resources for the policy to identify 604 policy dependency conditions to other computing resources.

Based at least in part on the identified dependency conditions, the policy management service may identify 606 other users, roles, and other policies for these other computing resources to determine 608 the potential impact of implementing the new policy. For instance, the policy management service may use the policy as defined by the administrator and determine the impact of implementing this policy for other computing resources specified in the dependency. The policy management service may determine whether certain users are granted, by virtue of the new policy, additional access privileges that may be undesirable to the administrator. Further, the policy management service may determine, based on the new policy, if users of other computing resources may be negatively impacted by implementation of the new policy. For example, if the new policy provides a level of access to a cryptographic key necessary to decrypt a computing resource, the policy management service may evaluate the new policy to determine whether there are any users of the computing resource that may be denied access to the cryptographic key and, as a result, not be able to access the encrypted computing resource.

The policy management service may utilize the information garnered from its determination of the impact to users, roles, and other policies to update 610 the GUI to indicate the potential impact of implementing the new conditional computing resource policy. The administrator of the user account that submitted the request to generate the new conditional computing resource policy may evaluate the GUI to identify the potential impact to other users, roles, policies, and computing resources resulting from implementation of the conditional computing resource policy. The administrator may use the GUI to update the policy, which may cause the policy management service to revise its impact determination and to update the GUI accordingly. Through the GUI, the administrator of the user account may provide an indication that the new conditional computing resource policy may be implemented or discarded. Thus, the policy management service may obtain the input from the administrator to determine 612 whether to implement the conditional computing resource policy.

If the administrator has specified that the conditional computing resource policy is not to be implemented, the policy management service may deny 614 the request. Alternatively, if the policy management service determines that the impact from implementing the conditional computing resource policy would result in users being unable to access other computing resources, the policy management service may deny 614 the request. However, if the administrator of the user account determines that the new conditional computing resource policy may be implemented or the policy management service determines that there is no negative impact in implementing the policy, the policy management service may associate 616 the conditional computing resource policy to the target computing resource and store the new policy within the policy database. Thus, in response to requests from a computing resource service to obtain policies applicable to a request to access the computing resource, the computing resource service may obtain the conditional computing resource policy from the policy database.

Figure 7:
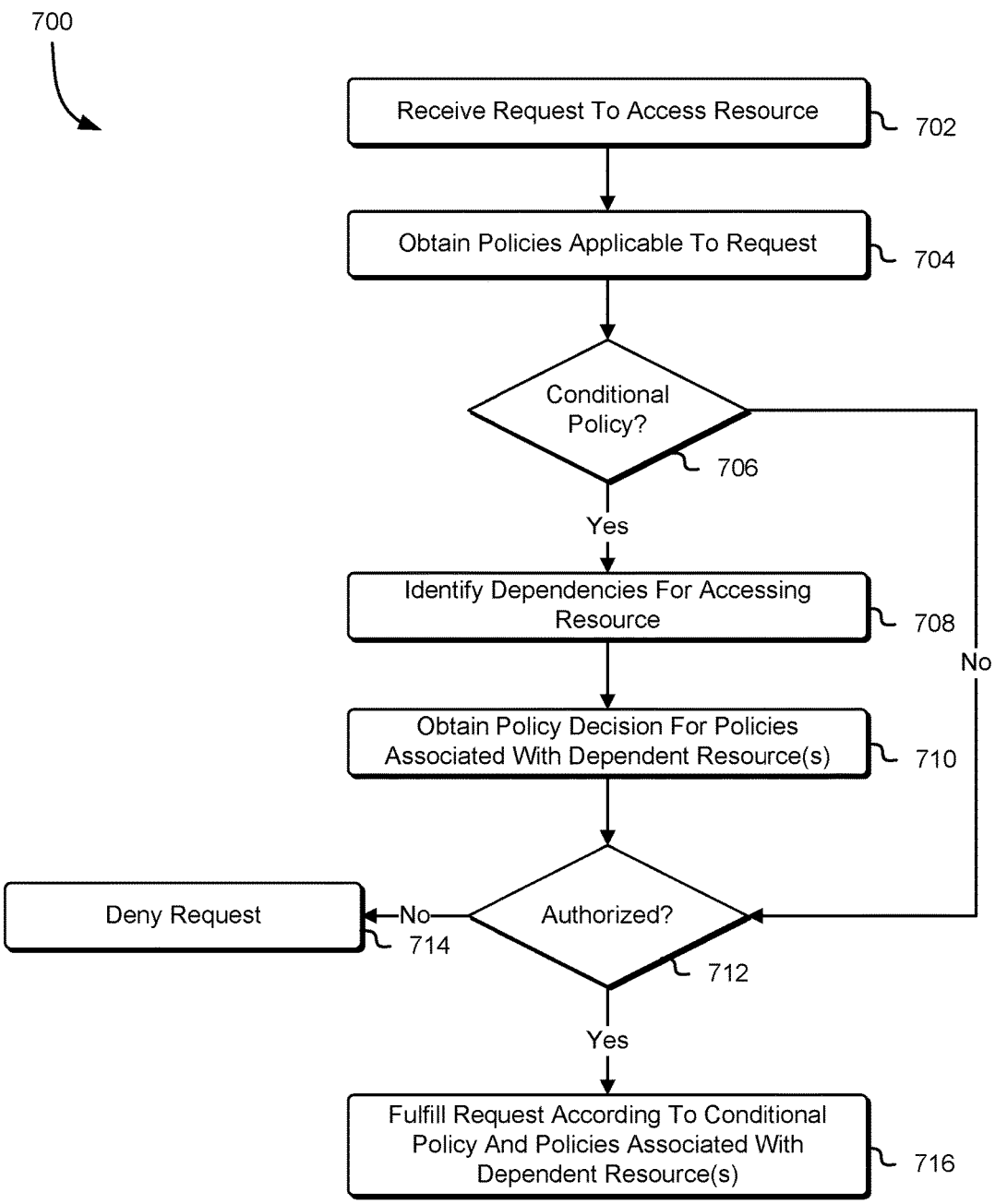
FIG. 7 shows an illustrative example of a process for determining whether to fulfill a request based at least in part on a conditional computing resource policy applicable to the request and other computing resource policies selected based at least in part on dependency conditions specified in the conditional computing resource policy in accordance with at least one embodiment.

As noted above, a computing resource service, in response to a request from a principal to access a computing resource, may obtain one or more policies applicable to the request to determine whether the principal is authorized to perform the requested actions. The one or more policies may include a conditional computing resource policy, which may specify, as a condition, a dependency that may need to be satisfied in order to provide the principal with the level of access necessary to fulfill the request. Accordingly, FIG. 7 shows an illustrative example of a process 700 for determining whether to fulfill a request based at least in part on a conditional computing resource policy applicable to the request and other computing resource policies selected based at least in part on dependency conditions specified in the conditional computing resource policy in accordance with at least one embodiment. The process 700 may be performed by a computing resource service that provides computing resources to users of the service and that utilizes computing resource policies to determine whether users are authorized to access these computing resources.

At any time, the computing resource service may receive 702 a request from a user to access a particular computing resource. The user may communicate with the computing resource service using one or more API calls to request access to the computing resource. Through the request, the user may provide its unique user identifier and corresponding set of credentials, which may be used to authenticate the user. The request for access to the service may be a digitally signed request and, as a result, may be provided with a digital signature. The service may send the request and the digital signature for verification to an authentication service.

The authentication service may verify that the digital signature is valid to determine whether the user can be authenticated. Alternatively, if the request is not digitally signed, the authentication service may evaluate the provided user identifier and credentials to determine whether the credentials are valid. If so, the authentication service may authenticate the user.

In some embodiments, the authentication service also obtains, based at least in part on the request, one or more policies that are applicable to the received request. The authentication service may provide the authentication decision and the one or more policies to the computing resource service, which may use the one or more policies to determine whether the user is authorized to perform the requested actions. Thus, the computing resource service may obtain 704 the one or more policies applicable to the request from the authentication service to determine whether the user is authorized to access the computing resource service and to perform the requested actions.

The computing resource service may evaluate the received policies to determine 706 whether a conditional computing resource policy is applicable to the request. As described above, a conditional computing resource policy may include a condition that a particular dependency is to be satisfied in order to grant the user a level of access specified in the policy. Thus, if the computing resource service identifies a conditional computing resource policy from the policies obtained from the authentication service, the computing resource service may evaluate the conditional computing resource policy to identify 708 any dependency conditions that may need to be satisfied to enable the user to access the target computing resource. The computing resource service may identify the computing resources specified in the one or more dependency conditions and, based at least in part on the identified computing resources, transmit a request the computing resource services used to maintain the identified computing resources to determine whether the user satisfies the dependency conditions.

As described above, each computing resource service that receives a request from a computing resource service to obtain a policy decision for a particular dependency may obtain policies applicable to the request to determine a level of access for the user to the computing resource specified in the dependency. Each computing resource service may generate its policy decision, which may denote whether the user is authorized to access a computing resource according to the dependency. These policy decisions may be provided to the computing resource service that received the request from the user to access a computing resource. Thus, the computing resource service may obtain 710 the policy decision for policies associated with the one or more dependent computing resources from these other computing resource services. The computing resource service may evaluate the policy decisions to determine 712 whether the user has satisfied the dependency conditions specified in the conditional computing resource policy and is authorized to access the computing resource.

If the user is not authorized to access the computing resource, be it by virtue of failing to satisfy the dependency conditions specified in the conditional computing resource policy or does not have the requisite level of access based at least part on the other policies obtained by the computing resource service, the computing resource service may deny 714 the user's request. However, if by virtue of the conditional computing resource policy and any other policies applicable to the request, the user is authorized to access the computing resource, the computing resource service may fulfill 716 the request according to the level of access defined in the conditional computing resource policy and the other policies that are applicable to the received request.

Figure 8:
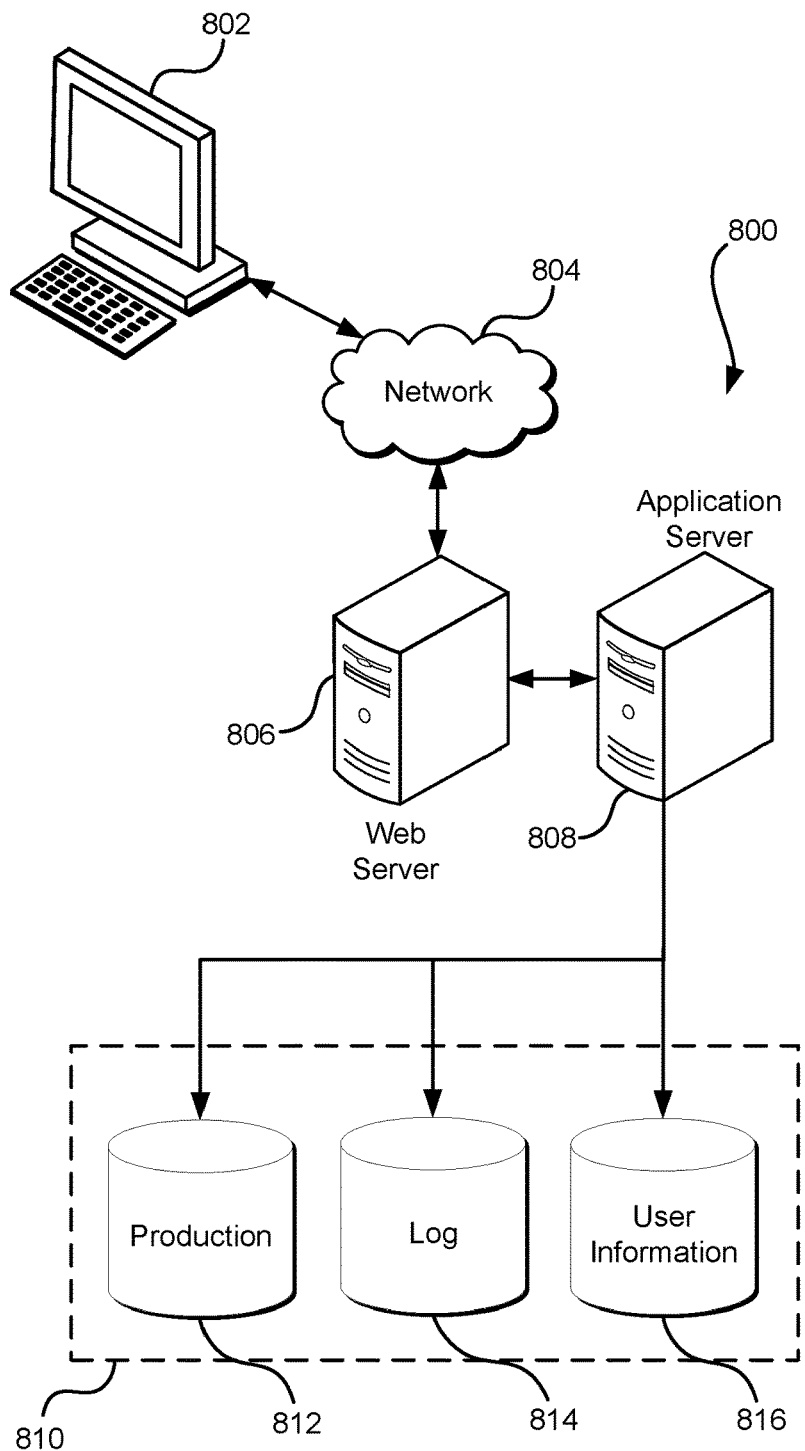
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining from a device utilized by a user, a first request to access a first computing resource managed by a first computing resource service;
as a result of the first request being successfully authenticated, determining, based at least in part on a set of parameters of the request and by a policy management service, first computing resource policies associated with the first computing resource and applicable to the request;
determining, by the policy management service, that the first computing resource policies include a conditional computing resource policy, the conditional computing resource policy specifying a dependency condition that conditions access to the first computing resource on authorization to access a second computing resource managed by a second computing resource service, where:
the conditional computing resource policy is generated via a computer interface in response to a second request to impose a set of conditions for enabling the user to access the first computing resource; and
the first computing resource service and the second computing resource service are distinct;
obtaining, by the policy management service, second computing resource policies associated with the second computing resource and applicable to the first request;
determining, based on evaluation of the second computing resource policies by the policy management service, that the user is authorized to access the second computing resource and satisfies the dependency condition;
determining, based on evaluation of other computing resource policies of the first computing resource policies by the policy management service, that the user is authorized to access the first computing resource; and
providing, via the device and to the user, access to the first computing resource in accordance with the first computing resource policies and the other computing resource policies.

2. The computer-implemented method of claim 1, further comprising:
obtaining another request to access the first computing resource;
determining a set of computing resource policies applicable to the other request;
obtaining a mapping of dependencies between the first computing resource and other computing resources managed by other computing resource services;
using the mapping of dependencies to identify one or more dependency conditions;
determining that the other request fulfills the one or more dependency conditions;
as a result of a determination that the other request fulfills the one or more dependency conditions, evaluating the set of computing resource policies;
determining, based on the set of computing resource policies, that the other request to access the first computing resource can be fulfilled; and
causing access to the first computing resource in accordance with the set of computing resource policies.

3. The computer-implemented method of claim 1, wherein further comprising:
obtaining another request to access the first computing resource;
obtaining, based on parameters of the other request, a first set of computing resource policies applicable to the other request, the first computing resource policies including the conditional computing resource policy;
determining a second set of computing resource policies associated with the second computing resource and applicable to the other request;
determining, based on the second set of computing resource policies, that the other request does not satisfy the dependency condition of the conditional computing resource policy; and
denying the other request.

4. The computer-implemented method of claim 1, further comprising transmitting a another request to the second computing resource service to obtain the second computing resource policies associated with the second computing resource and applicable to the first request.

5. A system, comprising:
one or more processors; and
memory including instructions that, as a result of being executed by the one or more processors, cause the system to:
obtain a first request to access a first computing resource managed by a first computing resource service;
as a result of the first request being successfully authenticated, obtain, based at least in part on parameters of the first request, a first set of policies applicable to the first request;
obtain, from the first set of policies, a conditional policy that specifies a dependency condition that is based at least in part on privileges for accessing a second computing resource managed by a second computing resource service, where:
the conditional policy is generated via a computer interface for defining a set of conditions to determine whether access to the first computing resource is to be granted; and
the first computing resource service and the second computing resource service are distinct;
transmit a second request to the second computing resource service to determine, based on a second set of policies associated with the second computing resource and applicable to the first request, whether the dependency condition is satisfied;
obtain a policy decision, the policy decision indicating whether the dependency condition is satisfied; and
determine, based on an evaluation of the policy decision and the first set of policies, whether to fulfill the first request.

6. The system of claim 5, wherein:
the policy decision specifies that the dependency condition has been satisfied; and
the instructions further cause the system to fulfill the first request according to the first set of policies.

7. The system of claim 5, wherein:
the policy decision specifies that the dependency condition has not been satisfied; and
the instructions further cause the system to deny the first request.

8. The system of claim 5, wherein the instructions further cause the computer system to deny the first request if at least one of the first set of policies do not provide privileges necessary for fulfillment of the first request.

9. The system of claim 5, wherein the instructions further cause the system to:
obtain, in response to the first request, a mapping of dependencies between the first computing resource and other computing resources;
identify, based at least in part on the mapping of dependencies, a dependency condition for a third computing resource; and
determine whether the dependency condition for the third computing resource is satisfied to determine whether to fulfill the first request.

10. The system of claim 5, wherein:
the second computing resource service is maintained through a remote service provider external to the system; and the instructions further cause the system to access the remote service provider to transmit the second request to the second computing resource service.

11. The system of claim 5, wherein:
the policy decision specifies the second set of policies; and
the instructions further cause the system to:
obtain the second set of policies; and
evaluate the second set of policies to determine whether the dependency condition is satisfied.

12. The system of claim 5, wherein:
the second request to the second computing resource service identifies a principal that submitted the first request to access the first computing resource; and
the second computing resource service determines whether the principal has been whitelisted to access the second computing resource to generate the policy decision.

13. A non-transitory computer-readable storage medium that stores executable instructions that, as a result of being executed by one or more processors of a computer system, cause the computer system to at least:
obtain, in response to a request to access a first computing resource managed by a first computing resource service and as a result of the request being successfully authenticated, a first set of computing resource policies applicable to the request;
determine, based on a first evaluation of the first set of computing resource policies, that the set of computing resource policies include a conditional policy that defines a dependency condition that is based at least in part on privileges for accessing a second computing resource managed by a second computing resource service, where:
the conditional policy is generated via a computer interface utilized to define the dependency condition usable to determine whether access to the first computing resource is to be granted; and
the first computing resource service and the second computing resource service are distinct;
determine, based at least in part on the privileges for accessing the second computing resource, whether the dependency condition is satisfied; and
determine whether to fulfill the request based at least in part on an evaluation as to whether the dependency condition is satisfied and on other privileges defined through the set of computing resource policies.

14. The non-transitory computer-readable storage medium of claim 13, wherein the instructions further cause the computer system to transmit a request to the second computing resource service to obtain a policy decision that can be used to determine whether the dependency condition is satisfied.

15. The non-transitory computer-readable storage medium of claim 14, wherein:
the policy decision specifies a set of policies usable to determine whether a principal that submitted the request to access the first computing resource is authorized, based on the privileges, to access the second computing resource; and
the instructions further cause the computer system to evaluate the set of policies to determine whether the dependency condition is satisfied.

16. The non-transitory computer-readable storage medium of claim 14, wherein the request to the second computing resource service causes the second computing resource service to evaluate one or more computing resource policies applicable to the second computing resource to generate the policy decision.

17. The non-transitory computer-readable storage medium of claim 13, wherein the instructions further cause the computer system to fulfill the request according to the set computing resource policies as a result of the dependency condition being satisfied.

18. The non-transitory computer-readable storage medium of claim 13, wherein the instructions further cause the computer system to:
obtain, in response to the request, a mapping of dependencies between the first computing resource and other computing resources, the mapping of dependencies defining a dependency condition for a third computing resource; and
determine whether the dependency condition for the third computing resource is satisfied to determine whether to fulfill the request.

19. The non-transitory computer-readable storage medium of claim 13, wherein the instructions further cause the computer system to:
obtain a third request to generate a conditional policy for the first computing resource, the third request specifying a dependency condition that is based at least in part on privileges for accessing a third computing resource;
generate the conditional policy; and
associate the conditional policy with the first computing resource such that, in response to requests to access the first computing resource, the conditional policy is used to determine whether to allow access to the first computing resource.

20. The non-transitory computer-readable storage medium of claim 13, wherein the instructions further cause the computer system to determine that the dependency condition is satisfied as a result of a determination that a principal that submitted the request to access the first computing resource has been whitelisted for accessing the second computing resource.

* * * * *